United States Patent
Sato

[11] Patent Number: 6,056,526
[45] Date of Patent: May 2, 2000

[54] MOLDING TOOL FOR SEALANT MATERIAL

[75] Inventor: Shinobu Sato, Akiruno, Japan

[73] Assignee: 3M Innovative Properties Company, St. Paul, Minn.

[21] Appl. No.: 08/552,911

[22] Filed: Nov. 3, 1995

[51] Int. Cl.[7] .................................................. B29C 33/32
[52] U.S. Cl. ......................... 425/3; 156/245; 156/307.7; 264/293; 264/313; 425/309; 425/457
[58] Field of Search ................................ 425/3, 457, 389, 425/87, 405.1, 458, 470, DIG. 33; 264/293, 313, 255, 259, 314; 156/293, 242, 245, 307.7; 296/210, 377, 213; 15/105.5; 249/65

[56] References Cited

U.S. PATENT DOCUMENTS

| | | |
|---|---|---|
| 2,677,633 | 5/1954 | Gross . |
| 3,085,291 | 4/1963 | Haes et al. ................................. 425/3 |
| 3,910,748 | 10/1975 | Kopernik .................................. 425/3 |
| 4,626,391 | 12/1986 | Taylor . |
| 4,666,387 | 5/1987 | Yokota et al. ............................. 425/3 |
| 4,767,154 | 8/1988 | Okamoto et al. ....................... 296/210 |
| 4,768,748 | 9/1988 | Leimkühler ............................... 425/3 |
| 4,915,610 | 4/1990 | Curry ...................................... 425/458 |
| 5,013,083 | 5/1991 | Yada et al. .............................. 296/210 |
| 5,234,653 | 8/1993 | Buzzoni et al. ......................... 264/255 |
| 5,324,470 | 6/1994 | Comert et al. .......................... 264/255 |

FOREIGN PATENT DOCUMENTS

| | | |
|---|---|---|
| 0 416 653 | 3/1991 | European Pat. Off. . |
| 0 558 033 | 9/1993 | European Pat. Off. . |
| 54-106548 | 8/1979 | Japan . |
| 3-273975 | 12/1991 | Japan . |

OTHER PUBLICATIONS

Hachk's Chemical Dictionary, p. 403, 1972.
Patent Abstracts of Japan, vol. 13, No. 415 (M–870), Sep. 13, 1989 & JP,A,01 152049 (Daihatsu Motor Co.), Jun. 14, 1989.
Patent Abstracts of Japan, vol. 10, No. 105 (M–471), Apr. 19, 1986 & JP,A,60 237267 (Three Bond K.K.) Nov. 26, 1985.

*Primary Examiner*—Tim Heitbrink
*Attorney, Agent, or Firm*—Harold C. Knecht III

[57] ABSTRACT

A tool for molding the surface of a resin sealant deposited within a generally U-shaped groove formed by two overlapping pieces that includes an elongated member shaped and dimensioned to fit within the groove and contact the surface of the sealant.

22 Claims, 7 Drawing Sheets

MOLDING TOOL FOR SEALANT MATERIAL

BACKGROUND OF THE INVENTION

1. Field of the Invention

The present invention related to a molding tool for sealant and a sealing method using the molding tool, whereby an outer surface of the sealant after sealing a jointed part of two members, for instance, a jointed part of exterior panels such as roof panels or the like of an automobile, especially, a jointed part at the bottom of a groove defined when the roof panels are jointed is refined in good shape.

2. Conventional Art

Figure 11:
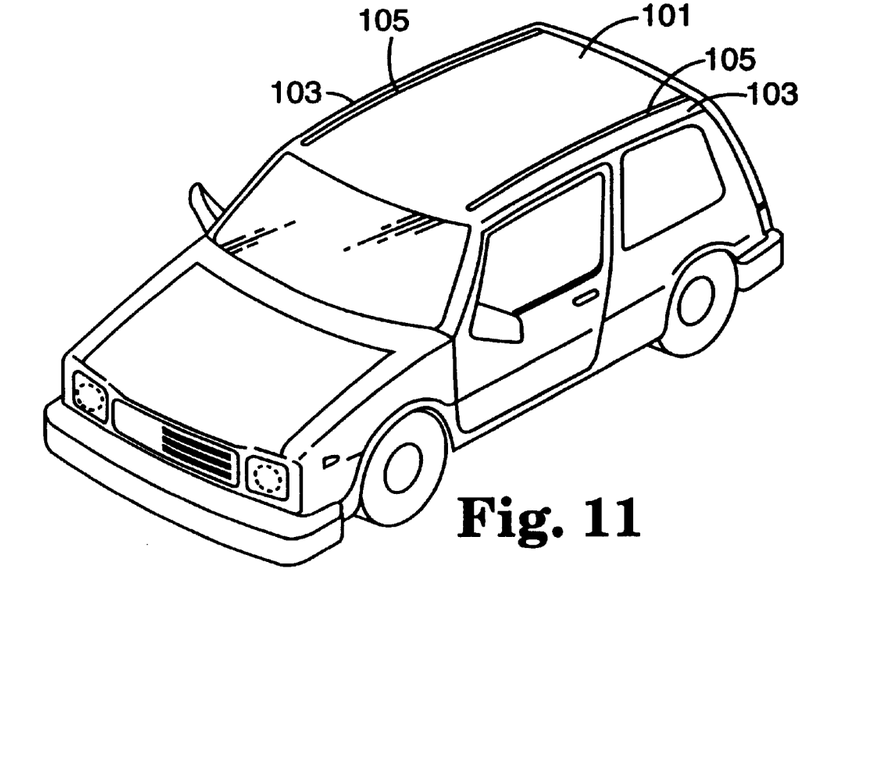
FIG. 11 is a perspective view of the configuration of a roof panel roof groove and sub roof panel, etc.
Figure 12:
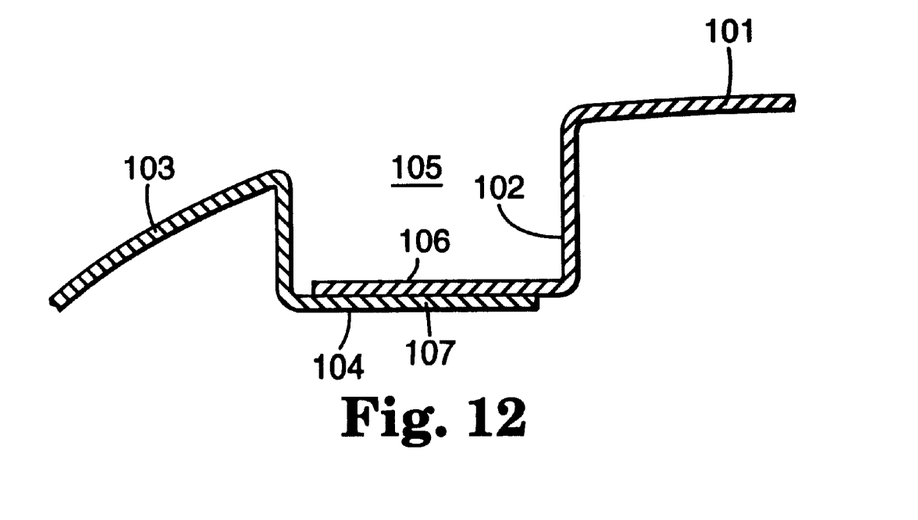
FIG. 12 is a sectional view of the roof groove.

Generally, exterior panels, e.g., roof panels of an automobile or the like are jointed by riveting or spot welding or the like manner. The exterior panels are usually jointed before an undercoating thereof, and after undercoating, the jointed part is sealed by a sealant for the purpose of prevention of water leakage. Thereafter, the whole of the exterior panel including the jointed part is processed through face coating. More specifically, in jointing roof panels of an automobile, a jointed part 107 is located at a bottom 106 of a roof groove 105 as indicated in FIGS. 11 and 12. The rain or the like is apt to gather in this roof groove 105, and therefore it is required to surely seal the jointed part 107. It is to be noted here that the roof groove 105 referred to above is a groove defined when a stepped part 102 at each side edge of a main roof panel 101 is overlaid and jointed to a stepped part 104 at a side edge of a sub roof panel 103 which is to be jointed to the main roof panel although only one roof groove 105 among the grooves formed at both edges of the main roof panel 101 is represented in FIGS. 12 and the other drawings.

In order to securely seal the jointed part 107, conventionally, a sealant has been provided at the surface of the jointed part 107 to enhance the sealing properties at the jointed part 107. For the sealant, such type of a sealant is used that is set with heat from the paste-like state, or melted or softened and thereafter hardened or solidified when receiving heat from the state of a solid rod or tape at normal temperatures. The sealant is formed of a thermoplastic or thermosetting composition including an epoxy resin, a urethane resin, an olefin resin, a vinyl chloride resin, an acrylic resin, an ethylene-vinyl acetate copolymer, etc. Japanese Patent Laid-Open Publication Nos. 54-106548 (106548/1979), 3-273975 (273975/1991), etc. relate to the above kind of sealant and a sealing method using the sealant.

Figure 13:
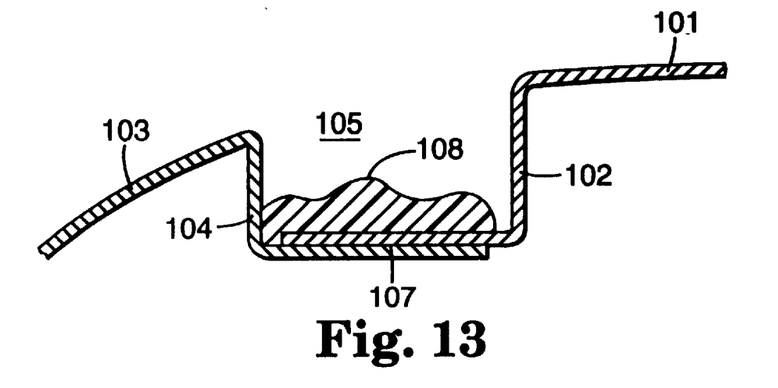
FIG. 13 is a diagram of a state where the sealant is set at the roof groove.
Figure 14:
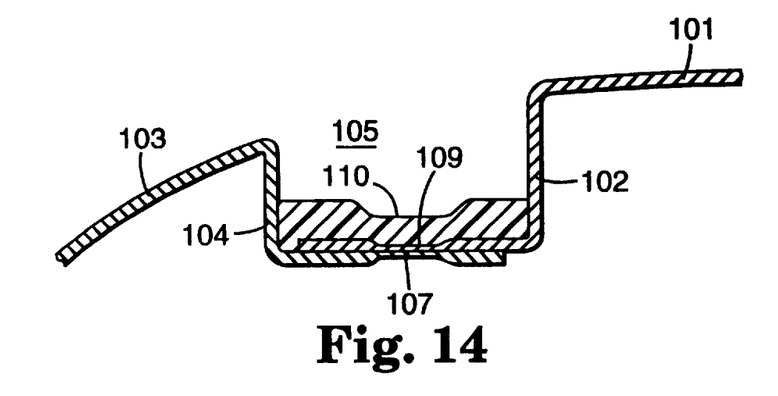
FIG. 14 is a diagram where the sealant is arranged in the roof groove when the jointed part of the roof groove results from spot welding.

In general, both the aforementioned paste-like sealant before solidified or hardened and the melted or softened sealant are considerably viscous liquid, and an outer surface 108 of the sealant is easy to finish rough as shown in FIG. 13, thus deteriorating the appearance of the sealant after sealing the jointed part 107. Moreover, even in the case where the viscosity of the sealant is relatively low to allow a projection/recess of the outer surface 108 to be coated smooth and flat, the outer surface 108 is prone to generate a projection/recess 110 corresponding to a recessed part 109 of the spot-welded part which is the jointed part 107, as in FIG. 14.

Figure 15:
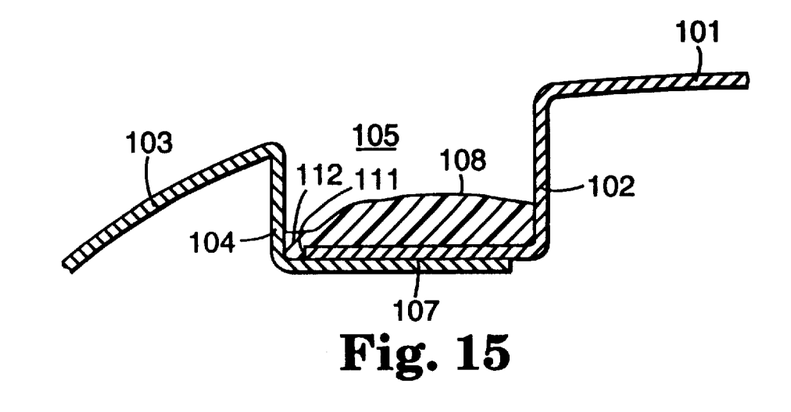
FIG. 15 is a diagram of a state where the sealant is arranged at the roof groove.

Further, as shown in FIG. 15, the main roof panel 101 is jointed to the sub roof panel 103 with a gap 112 formed between an edge 111 of the stepped part 102 of the main roof panel 101 and the stepped part 104 of the sub roof panel 103. The gap 112 is turned to a recessed part, corresponding to which the outer surface 108 of the sealant is made rough. Besides, the main roof panel 101 jointed to the sub roof panel 103 by a jointing means, for example, spot welding or the like is often corrugated in the longitudinal direction thereof, consequently degrading the appearance of the sealant at the roof groove 105 not a little.

Figure 16:
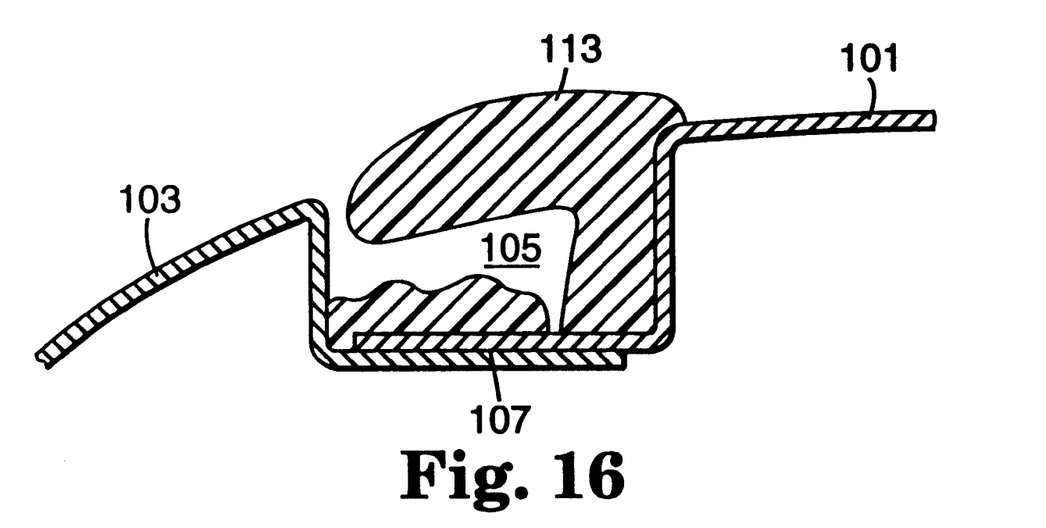
FIG. 16 is a sectional view when a roof molding is installed in the roof groove.

For preventing the inferior or defective appearance of the sealant from being noticed from outside, by way of example, a decorative member 113 called as a roof molding has been sometimes attached to the roof groove 105 to cover the sealant as indicated in FIG. 16. This method is disadvantageous, though, in that the number of parts and working processes is increased. Since the roof molding is a separate part from the roof panel, the roof molding should be painted with the same color beforehand as that of the roof panel or the total of the roof panel should be painted again after the roof molding is installed so as to keep the roof in the same color. The number of working steps is undesirably increased.

An object of the present invention is to provide a molding tool for sealant and a sealing method using the molding tool whereby the outer surface of the sealant is refined in good shape without increasing the number of parts and working steps.

SUMMARY OF THE INVENTION

A molding tool for sealant according to the present invention is a tool for molding an outer surface of a sealant after the sealant formed of resin for covering a projecting/recessed part at a jointed part where two members are jointed with each other and sealing the jointed part is disposed at a surface of the jointed part, with having a molding surface which extends along the jointed part and covers at least the outer surface of the sealant to be in touch with the outer surface thereof, thereby pressing and molding the outer surface thereof.

A molding tool for sealant according to the present invention is a tool for molding an outer surface of a sealant after the sealant formed of resin for covering a projecting/recessed part at a jointed part where two members are jointed with each other and sealing the jointed part is disposed at a surface of the jointed part when the two members are jointed to form a groove of a generally U-shaped cross section and the jointed part is located at a bottom of the groove. The molding tool comprises a plate-like main body and a pressing member. The plate-like main body is able to be fitted into the groove and has a molding surface which extends along the groove, with approximately a same width as that of the groove in a direction orthogonal to the extending direction and to a depthwise direction of the groove, and covers the outer surface of the sealant to be in touch with the outer surface thereby presses and molds the outer surface. The pressing member has an expansible tubular body set at the surface of the main body confronting to the molding surface. The tubular body expands when fluid expanding the tubular body is injected into a hollow thereof thereby to press right and left side walls extending in the depthwise direction of the groove and, consequently, press the outer surface of the sealant via the molding surface.

According to a sealing method using a molding tool of the present invention, an outer surface of a sealant formed of resin for covering a projecting/recessed part at a jointed part where two members are jointed with each other and sealing the jointed part after the sealant is arranged at the jointed part is molded. The method comprises a disposing process to bring a molding surface of the molding tool for molding the outer surface of the sealant in touch with the outer surface of the sealant, specifically, wherein the molding surface extending along the jointed part and covering at least the outer surface of the sealant is brought in touch with the outer surface thereby pressing and molding the outer surface, a molding process to heat the sealant while pressing the molding surface to the outer surface of the sealant subsequent to the above disposing process, and a removing process to remove the molding tool from the sealant subsequent to the molding process.

According to a sealing method using a molding tool of the present invention, an outer surface of the sealant formed of resin for covering a projecting/recessed part of a jointed part where two members are jointed with each other and tightly sealing the jointed part is molded. The method comprises a preparing process in which the outer surface of the sealant is brought in touch with a molding surface of the molding tool for molding the outer surface of the sealant by pressing the outer surface of the sealant, thereby preparing the sealant provided with the molding tool; a disposing process subsequent to the preparing process in which the sealant with the molding tool is disposed at the jointed part; a molding process subsequent to the disposing process in which the sealant is heated while the molding surface is pressed to the outer surface of the sealant; and a removing process subsequent to the molding process in which the molding tool for sealant constituting the sealant with the molding tool is removed from the sealant.

In the arrangement as above, the molding surface of the molding tool covers the outer surface of the sealant, and at the same time keeps touch with the outer surface, thereby pressing the outer surface of the sealant towards the jointed part. Therefore, the outer surface of the sealant is molded in conformity with the shape of the molding surface. The molding tool for sealant thus acts to form the outer surface of the sealant.

DETAILED DESCRIPTION OF THE EMBODIMENTS

Preferred embodiments of a molding tool for sealant according to the present invention will be described with reference to the accompanying drawings including those of the conventional art. A sealing method using the molding tool according to the present invention is carried out with the use of the molding tool for sealant of the above embodiments. In the drawings, like parts are designated by like reference numerals.

Figure 1:
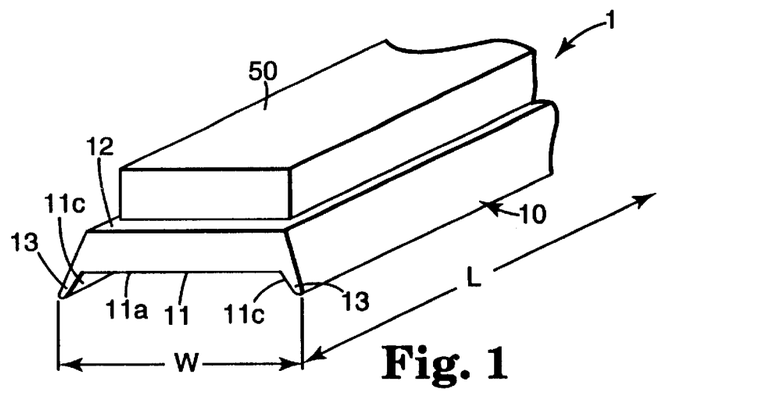
FIG. 1 is a perspective view of a molding tool for sealant in one embodiment of the present invention.
Figure 2:
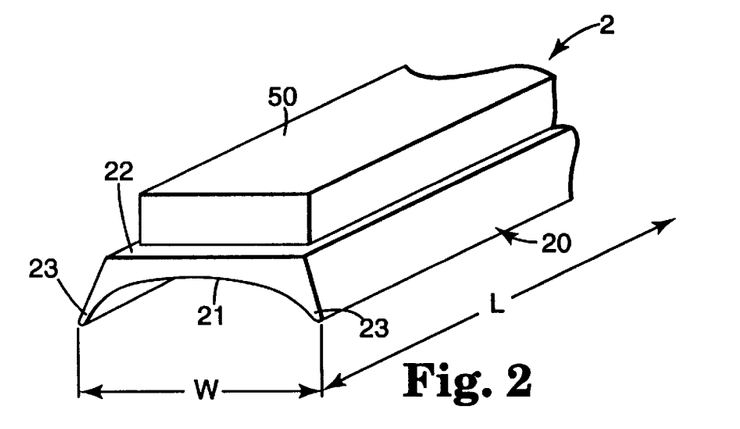
FIG. 2 is a perspective view of a molding tool for sealant in a different embodiment of the present invention.
Figure 3:
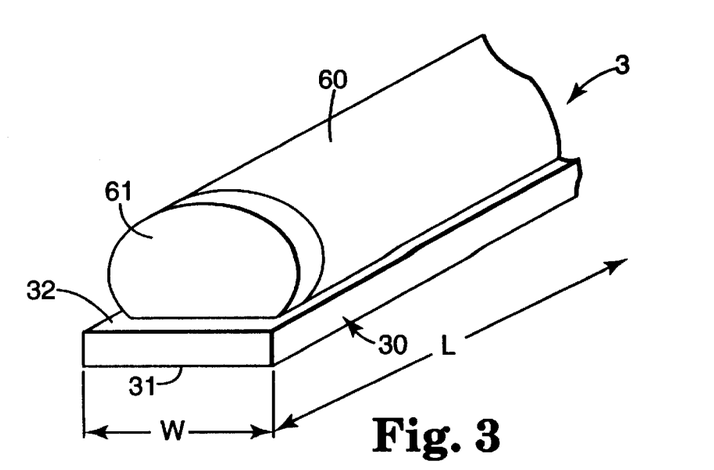
FIG. 3 is a perspective view of a molding tool for sealant in a yet different embodiment of the present invention.

Referring to FIGS. 1–3, a molding tool 1 for sealant consists of a main body 10, 20, or 30 and a pressing member 50, or 60. In the preferred embodiments, the molding tool 1 is applied to the roof groove 105 described earlier to mold the outer surface of a sealant disposed in the roof groove 105.

Figure 4:
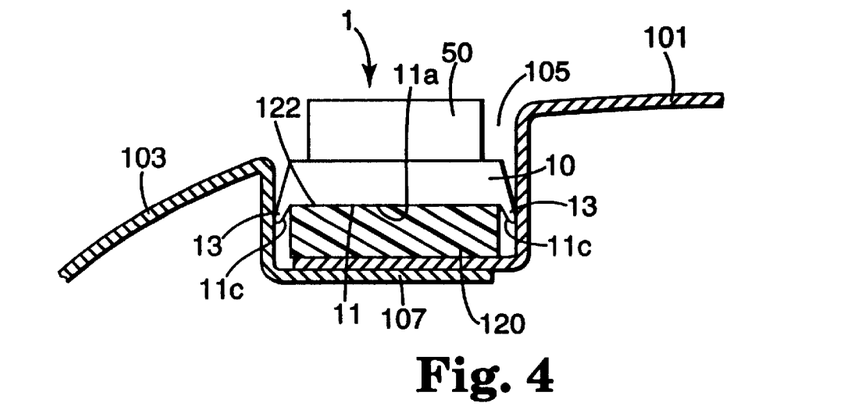
FIG. 4 is a diagram indicating a case where the molding tool of FIG. 1 is arranged at a roof groove when a jointed part is located at the bottom of the roof groove.
Figure 9:
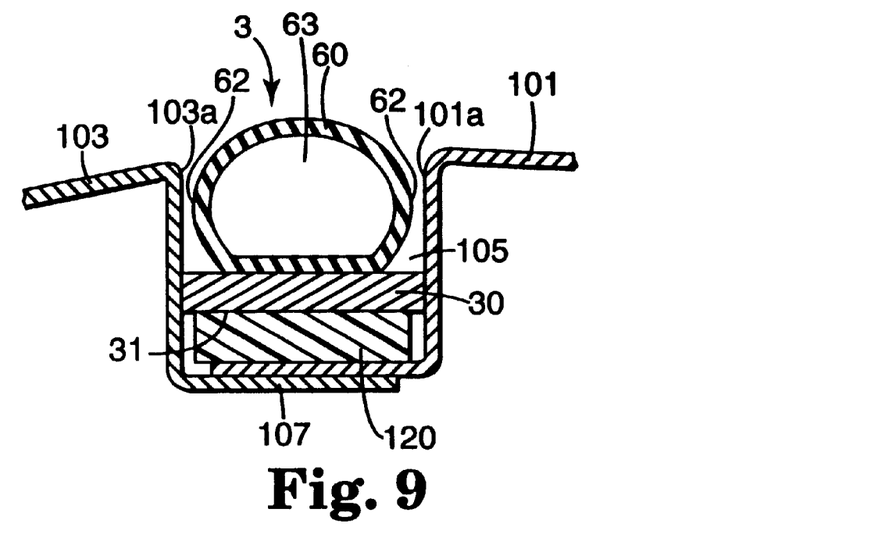
FIG. 9 is a diagram representing a case where the molding tool of FIG. 3 is arranged at a roof groove when a jointed part is located at the bottom of the roof groove.

As shown in FIG. 1 and the other drawings, the main body 10, 20, or 30 is a slim band of plate in such length "L" that covers the whole outer surface of the sealant disposed in the roof groove 105. The width "W" of the main body 10, 20, or 30 is almost equal to that of the roof groove 105, so that the main body 10, 20, 30 is smoothly fitted in the roof groove 105 as indicated in FIGS. 4, 7 and 9. Accordingly, the appearance not only at the central part of a sealant 120, but edge parts 121 of the sealant 120 is maintained good as is clear from, e.g., FIG. 6.

If two members are not jointed in a manner to form the roof groove 105 as above, but are jointed, for instance, in the overlapped state on a flat surface, the width "W" of the main body 10, 20, or 30 is so selected as to cover the outer surface of the sealant.

A metallic material such as stainless, aluminum, magnesium alloy, copper, iron or the like, or a resin material such as polyamide, polyimide, acryl, vinyl chloride, polyethylene, polystyrene, polyester, polyurethane, TEFLON (TEFLON is the trademark of polytetrafluoroethylene), etc. can be used for the main body 10, 20, or 30. The sealant 120 used in the embodiments is, similar to the conventionally employed sealant, of a type, e.g., that is hardened after being heated by a general heating means such as a sealing oven or the like. Therefore, the material for the main body 10, 20, or 30 is suitably a heat-proof resin or metallic material to the heating temperature in the sealing oven. When a metallic material is used as a material for the main body 10, 20, or 30, stainless that does not rust even in the long-time use is most fit. If a kind of resin is used, a fluoric resin such as TEFLON (TEFLON is the trademark for polytetrafluoroethylene) or the like showing release characteristics to the above sealant and favorable heat resistances is preferable.

A molding surface 11 of the main body 10 in touch with an outer surface 122 of the sealant 120 molds the outer surface 122 of the sealant 120 which is a paste or heated to be softened in the above sealing oven. The molding surface 11 is constituted of a flat surface 11a and inclined surfaces 11c. The inclined surface 11c is an outer surface of a projecting part 13 projecting from the flat surface 11a at a side edge of the main body 10 in the widthwise direction. The molding surface 11 eliminates the rough of the outer surface 122 of the sealant 120 which is a cause for the above-described defective appearance, thereby to refine the sealed outer surface 122 of the sealant 120. Meanwhile, the flat surface 11a makes the outer surface 122 of the molded sealant 120 smooth without projections/recesses thereby to shape the outer surface 122. Because of the presence of the inclined surfaces 11c, edge parts 121 in the widthwise direction of the sealant 120 are molded with each into good appearance.

In a modification of the molding surface 11, the surface may be a smooth curve, e.g., arc as represented by a molding surface 21 in the main body 20 of FIG. 2. Alternatively, the whole surface may be a plane without the inclined surface 11a such as a molding surface 31 of the main body 30 indicated in FIG. 3.

The projecting part 13 and a projecting part 23 located at each side edge of the main body 20 in FIGS. 2 and 7 respectively work to refrain the sealant 120 from leaking in a direction opposite to the pressing direction along the side walls of the roof groove 105 when the sealant is pressed by the molding surface 11, 21.

Since the inclined surfaces 11c are formed at both edges of the flat surface 11a of the main body 10, in the case where the sealant 120 before hardened is a rod with the width approximately equal to that of the flat surface 11a, the sealant 120 can be easily positioned to the main body 10 by the inclined surfaces 11c and readily supported to the main body 10.

Characters, numbers, symbols or patterns may be cut in the molding surface 11, 21, 31. A portion where the characters, numbers, symbols or patterns are cut becomes a recessed part or a projecting part. The surface with the characters or the like eliminates the rough of the outer surface 122 of the sealant 120 which would result in the inferior appearance. Moreover, when the characters, numbers, symbols or patterns are engraved in the outer surface 122, the sealant 120 is formed in good shape.

Meanwhile, the molding surface 11, 21, 31 is desired to have release characteristics to the sealant 120. The molding tool 1, etc. can be smoothly detached from the sealant 120 after molding the sealant 120 without hurting the outer surface 122 of the molded sealant 120. For adding the release characteristics to the molding surface 11, 21, 31, other than using a material with release characteristics for the main body 10, 20, 30, it is possible to apply an agent with release characteristics to the molding surface 11, 21, 31, provide the molding surface 11, 21, 31 with another member with release characteristics, namely, a release member, or nitrify the molding surface 11, 21, 31. Particularly, it is simple and therefore suitable to apply an agent with release characteristics to the molding surface 11, 21, 31 or provide the molding surface 11, 21, 31 with the release member as above.

For the agent with release characteristics referred to above, a release agent including at least in one of silicone resin, silicone rubber, fluoric resin or fluoric rubber is fit, because the above agent is effective irrespective of the kind of resin included in the sealant 120. The agent is applied to the molding surface 11, 21, 31 by a general application means such as a roller, spray or brush, etc. A concrete example of the agent is "MOLD RELEASE AGENT RESIN RELEASE" by Minnesota Mining & Manufacturing Company (3M) which is available in a spray can.

The release member alike desirably contains at least in one of silicone resin, silicone rubber, fluoric resin or fluoric rubber from the same reason as for the above agent. The release member can be attached to the molding surface 11, 21, 31 via a tackifier or an adhesive. "TEFLON FILM ADHESIVE TAPE #5480" produced by Minnesota Mining & Manufacturing Company (3M) is an example of the release member. TEFLON is the trademark for polytetrafluoroethylene. The pressing member 50, 60 will be discussed below.

The pressing member 50, 60 is, as indicated in FIGS. 1–3, set on a surface 12, 22, 32 facing the corresponding molding surface 11, 21, 31 of the main body 10, 20, 30.

When the jointed part 107 is magnetizable, the pressing member 50 is a slim plate-like plastic magnet as shown in FIGS. 1 and 2. The pressing member 50 has a slightly smaller width than the width "W" of the main body 10, 20 and extends nearly the whole length of the main body 10, 20. The pressing member 50 may be constituted of a plurality of plastic magnets arranged discontinuously in the longitudinal direction of the main body 10, 20 with a predetermined distance to each other on the surface 12, 22 of the main body.

The pressing member 50 presses the main body 10, 20 to the jointed part 107 by magnetic force acting between the jointed part 107 and the pressing member 50. The plastic magnet of the pressing member 50 preferably includes a heat-proof resin. The plastic magnet easily reduces the weight of the whole of the molding tool of the present embodiments and, at the same time little changes the shape and size even when it is repeatedly heated and cooled for a long time. That is, the whole molding tool for sealant is prevented from changing the shape and size. The heat-proof resin is favorably a thermosetting resin including an epoxy resin, or a heat-proof thermoplastic resin such as polyamide, polyether ketone, polyphenylene-sulfide, etc. The pressing member 50 is attached to the surface 12, 22 of the main body 10, 20, for example, by an adhesive or the like.

In the case where the jointed part 107 is formed at the bottom of the roof groove 105 and the molding tool is used while being fitted in the roof groove 105, although it is possible to use the molding tool equipped with the pressing member 50 as in FIGS. 4 and 7, the molding tool with another pressing member 60 as in FIG. 3 may be employable.

The pressing member 60 is a hollow tubular member, for instance, which is formed of an expansible material. Both ends of the member are shut, for example, by metallic lid plates 61. The tubular pressing member 60 is better to be elliptic having a longer diameter in the widthwise direction of the main body 30. In addition, an injection port (not shown) is formed at least in one of the lid plates 61 to inject gas or the like fluid to a hollow 63 of the pressing member 60 having both ends closed by the lid plates 61. Gas or the like is supplied to or discharged from the hollow part 63 through the injection port. The width of the pressing member 60 in a direction of the above longer diameter is, as is clearly recognized in FIG. 3, slightly smaller than the width "W" of the main body 30, while the length of the pressing member 60 is almost equal to the total length "L" of the main body 30. The pressing member 60 as above is set to the surface 31 of the main body 30, for example, by an adhesive or the like.

The molding tool 3 set with the pressing member 60 is fitted in the roof groove 105 as shown in FIG. 9. At this time, it is preferable that each part of the larger diameter of the elliptic pressing member 60 is positioned at least inside the roof groove 105. Unless the part of the larger diameter is present inside the roof groove 105, it is necessary to press the pressing member 60 further into the roof groove 105.

Figure 10:
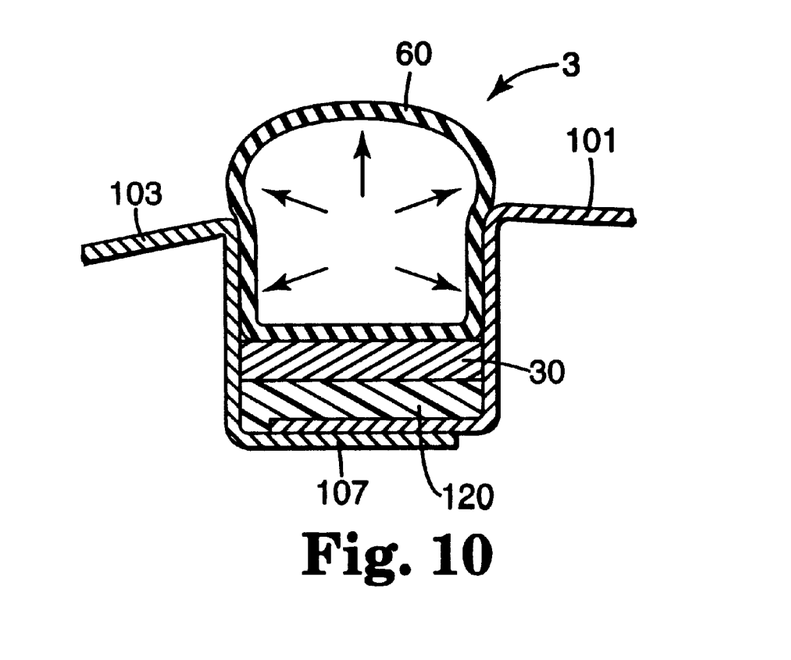
FIG. 10 is a diagram when a pressing member presses a sealant thereby to deform the sealant in the state of FIG. 9.

Subsequently, referring to FIG. 10, the pressing member 60 expands when gas or the like is injected into the hollow part 63 of the member 60, bringing each area 62 of the outer surface corresponding to the above part of the larger diameter of the pressing member 60 into touch with side walls 101a, 103a of the roof groove 105. As a result, the area 62 presses the side walls 101a, 103a. When the area 62 presses the side walls 101a, 103a as above, the molding tool 3 fitted in the roof groove 105 is controlled by the friction force between the area 62 and the side walls 101a, 103a not to move in a direction to slip out from the roof groove 105. Therefore, as gas is injected more to the pressing member 60 which further expands the pressing member, the main body 30 with the pressing member 60 is depressed towards the bottom of the roof groove 105, accordingly pressing the sealant 120.

Heat-proof rubber is included as a favorable material of the pressing member 60. The heat-proof rubber is ethylene-propylene-diene-methylene (EPDM), chlorosulfonated polyethylene (named as "Hypalon" by Du Pont), silicone rubber basically composed of polysiloxane or fluoric rubber such as hexafluoropropylene-vinylidene fluoride copolymer, etc. The area 62 of the pressing member 60 has such friction resistance that allows the main body 30 to press the sealant 120. Although the friction resistance is easily obtained if the pressing member 60 contains the aforementioned rubber material, it is more desired that the outer surface of the pressing member 60 is coated with cross-linked polyurethane or the like resin to generate viscosity at the heating temperature of the sealant for the purpose of enhancing the friction resistance.

A method for sealing the above jointed part with the use of the molding tool 1, 2, 3 and the sealant 120 through the operation of the molding tool 1, 2, 3 will be discussed now.

The heating treatment for the sealant 120 to be used for sealing the jointed part of the exterior panel with the molding tool 1, 2, 3 is carried out in the sealing oven described before. Moreover, the sealant 120 is preferably of a kind partially or totally hardened. If the sealant is a type not hardened, the sealant may be melted or softened in some cases and deformed in a drying process after the exterior panel is face coated, or the material wrinkles as a result of the shrinkage when the face coating film is hardened. The appearance of the molded sealant may be thus hurt. Specifically, the setting sealant 120 is, for example, "MELT SEAL TAPE #E9280" manufactured by Minnesota Mining & Manufacturing Company.

The above sealant 120 is preferred to include a volume expansion agent. The volume expansion agent offsets the volumetric shrinkage brought about when the sealant 120 is solidified or hardened, thereby preventing a gap from being generated between the molding surface 11, etc. of the molding tool 1, etc. and the outer surface 122 of the sealant 120. Accordingly, the molding surface 11, 21, 31 is tightly held in touch with the outer surface 122. The outer surface 122 of the sealant 120 is rendered totally uniform. For the above volume expansion agent, 4,4'-oxybisbenzenesulfonyl-hydrazide (OBSH), azodicarbonamide or the like component generating gas when decomposed with heat, or thermal expansive microcapsules involving hydrocarbon is suitable. The aforementioned microcapsules are specifically, e.g., "MATSUMOTO MICROSPHERE F-80" manufactured by (Matsumoto Oil & Fat Co., Ltd.), "(EXPANCEL) DU551" by (Kemanovel, Inc.), etc.

Supposing that the jointed part 107 is located at the bottom of the roof groove 105, in FIGS. 4 and 7, the above sealant 120 is arranged at the upper surface of the jointed part 107 located at the bottom in the roof groove 105 in a molding process.

Among the molding tools 1, 2 and 3, for example, the molding tool 1 is fitted in the roof groove 105 so that the molding surface 11 thereof is in touch with the outer surface 122 of the sealant 120. While the molding surface 11 is kept in touch with the outer surface 122 of the sealant 120, the molding tool 1 is disposed to allow the sealant 120 to be pressed to the jointed part 107 by means of the molding surface. When the molding tool 1, 2 is employed, the molding surface 11, 21 of the main body 10, 20 presses the sealant 120 to the jointed part 107 owing to magnetic force acting between the plastic magnet as the pressing member 50 and the jointed part 107 of the exterior panel made of a metallic material.

If the molding tool 3 is used, as shown in FIG. 9, when gas or the like is injected to the hollow part 63 of the pressing member 60 after the molding tool 3 is fitted in the roof groove 105, the pressing member 60 is expanded, whereby the molding surface 31 of the main body 30 presses the sealant 120 against the jointed part 107 as described above.

Figure 5:
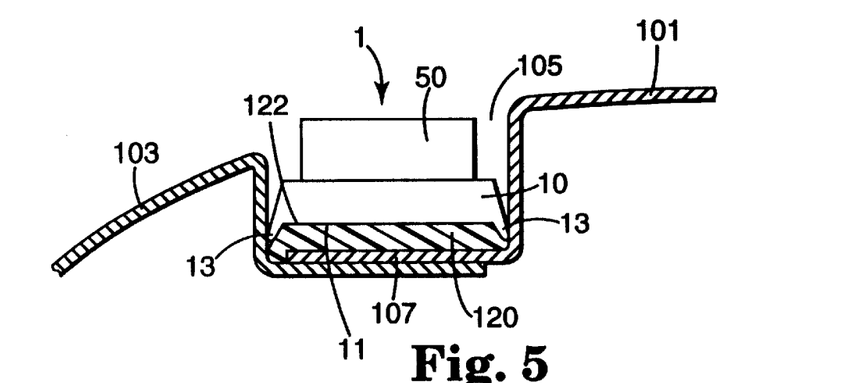
FIG. 5 is a diagram when a pressing member presses a sealant thereby to deform the sealant in the state of FIG. 4.

While the molding surface 11, 21, or 31 presses the sealant 120 to the jointed part 107, the sealant 120 is heated by the sealing oven. Therefore, the outer surface 122 of the sealant 120 of a paste or heated and then softened in the sealing oven is molded by the molding surface 11, 21, 31 as illustrated in FIGS. 5, 7 and 10, and moreover the sealant 120 is molded in conformity with the shape of the jointed part 107 to tightly shield the jointed part 107. The sealant is subsequently hardened with heat.

In the manner as above, the outer surface 122 of the sealant 120 is molded in conformity with the shape of the molding surface 11, 21, 31 without the projections/recesses of the jointed part 107 transferred thereto.

Figure 6:
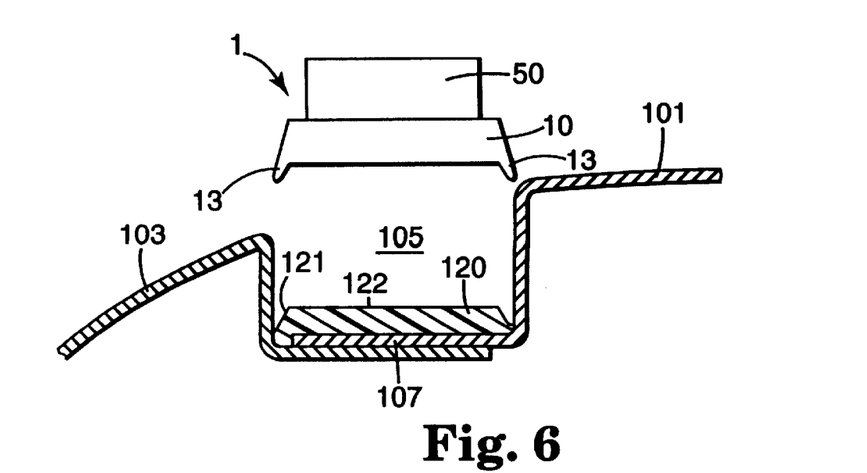
FIG. 6 is a diagram when the molding tool is removed from the roof groove subsequent to the state of FIG. 5.
Figure 7:
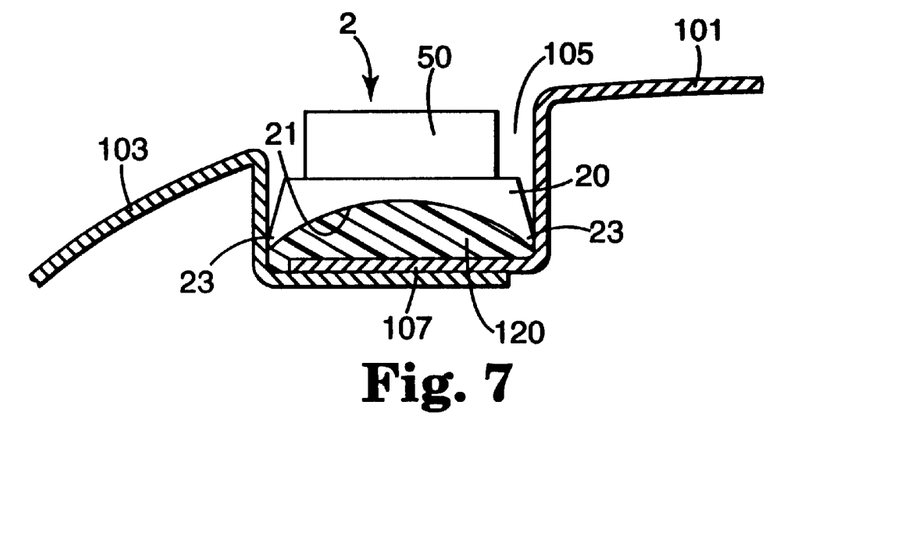
FIG. 7 is a diagram representing a case where, while the molding tool of FIG. 2 is arranged at a roof groove when a jointed part is located at the bottom of the roof groove, a pressing member presses a sealant thereby to deform the sealant.
Figure 8:
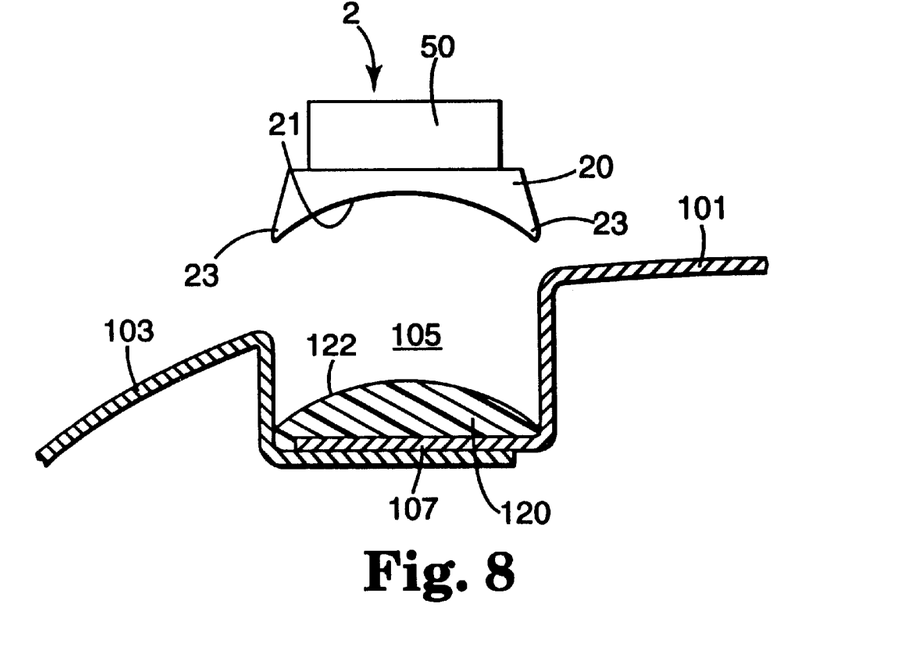
FIG. 8 is a diagram when the molding tool is removed from the roof groove subsequent to the state of FIG. 7.

Then, referring to FIGS. 6 and 8, the molding tool 1, 2, 3 is removed from the roof groove 105, thus completing the formation of the outer surface 122 of the sealant 120. In the case where the molding tool 3 is used, the molding tool 3 is removed from the roof groove 105 after gas or the like is discharged from the hollow part 63 of the pressing member 60.

As described hereinabove, since the molding surface of the molding tool is pressed to the outer surface of the sealant of a paste or solid rod, the outer surface of the sealant is formed corresponding to the shape of the molding surface, and accordingly, projections/recesses formed in the jointed part are prevented from being transferred to the outer surface of the sealant. It becomes consequently unnecessary to install a decorative member such as a roof molding or the like referred to earlier, reducing the number of parts and steps in assembling, for example, the roof panel. After sealing the jointed part, furthermore, the whole roof including the sealant can be coated easily in the same color.

Although the molding tool is applied to the roof groove 105 in the foregoing embodiments, the molding tools 1, 2 using a magnet as the pressing member are not restricted to the application to the roof groove 105, but may be employable to a sealant set at a rough jointed part which is positioned at a part of a plane.

In addition, although the main body 10, 20, 30 is provided with the pressing member 50, 60 in the above embodiments, the pressing member 50, 60 may be omitted and instead, the sealant is arranged to be pressed by the weight of the main body 10, 20, or 30 itself. However, this arrangement is limited only to a case where the jointed part 107 is located in a direction of gravity to the main body 10, 20, 30.

Since the pressing member 50, 60 is arranged for the main body 10, 20, 30, a separate pressing means is not necessary, thereby lightening the total weight of the molding tool 1, etc.

Although the pressing member 50, 60 is set to the main body 10, 20, 30 in the above description, the present invention is not restricted to above and the pressing member 50, 60 may be formed integrally with the main body 10, 20, 30.

The jointed part 107 is formed of such material attracted by magnetism as iron or the like, or is magnetized in the above examples. However, if the jointed part 107 is not formed of a magnetic material, a magnetizing member, e.g., a permanent magnet or an electromagnet may be provided at the rear surface of the jointed part opposite to the front surface where the sealant is arranged.

Instead of providing the magnetized pressing member, the main body can be formed of a magnetized material such as a magnet or the like. Supposing that the main body is formed of the magnetized material, when the jointed part is magnetizable or magnetizable member is provided at the rear surface of the jointed part, a molding tool having no pressing member can be provided. In this case, the magnetized material forming the main body is favorably the plastic magnet as described before.

In the foregoing description, the sealant 120 is molded thereby to tightly seal the jointed part 107 by bringing, for example, the molding surface 11 of the molding tool 1 for sealant in touch with the outer surface 122 of the sealant 120 after the sealant 120 is disposed at the jointed part 107. However, the method is not limited to the above, and a sealant with a molding tool may be prepared at the molding surface 11 or the like by making the outer surface of the sealant touch with the molding surface 11 or the like beforehand, which is to be disposed at the jointed part 107.

The above sealant with the molding tool is manufactured by a supplier of the sealant and fed to a user of the sealant. The user can use the sealant with the molding tool in the same manner as the conventional sealant. Therefore, the sealing method allows the user to omit the disposing process in which the molding surface is brought in touch with the outer surface of the sealant after the sealant is disposed at the jointed part 107, with enabling molding of the outer surface of the sealant after the jointed part 107 is sealed.

Further, the sealant with the molding tool provides recycling of the molding tool 1 or the like for sealant, etc. That is, the molding tool 1 or the like for sealant used by the user is withdrawn to the supplier, so that a fresh sealant with a molding tool is produced and supplied from the withdrawn molding tool 1 or the like for sealant.

The sealant with the molding tool is formed by utilizing the tackiness of the sealant itself. Generally, there are two kinds of sealants, i.e., (i) one that is tack-free almost without any tackiness at normal temperatures and (ii) one that loses its tack strength after heated and melted, thereby sealing the jointed part although it shows the tack at normal temperatures. It is preferable to use a sealant of the above type (ii) for the sealant with the molding tool. Alternatively, the sealant with the molding tool may be formed by laminating a sealant of the type (ii) with a sealant of the type (i).

If the tack-free sealant is used, the outer surface of the sealant while kept in touch with the molding surface 11 of the molding tool for sealant is partially or totally fused to the molding surface 11 or the like, whereby the sealant is temporarily bonded with the molding surface 11 or the like. In consequence, the sealant with the molding tool is obtained. The outer surface of the sealant is partially or totally fused to the molding surface 11 or the like by heating from the side of the molding tool for sealant or by way of fusing such as ultrasonic fusing, etc.

It is also possible to provide the sealant with the molding tool for sealant via a tackifier. The tackifier is desirably of a type that has the tackiness at normal temperatures, but loses the tackiness through setting when it is heated and melted, thereby sealing the jointed part 107.

As is fully described hereinabove, according to the molding tool for sealant and the sealing method using the molding tool of the present invention, the molding surface of the molding tool covers the outer surface of the sealant to be in touch with the outer surface of the sealant, thereby pressing the outer surface to the jointed part. Therefore, the outer surface of the sealant is formed in conformity with the shape of the molding surface. In consequence, it is prevented that the projections/recesses of the jointed part are transferred to the outer surface of the sealant. Since it is not necessary to install the decorative member such as the roof molding or the like, the number of parts and working steps when the roof panel or the like is assembled is decreased.

Moreover, according to the molding tool for sealant of the present invention, in the case where the molding tool is arranged at a groove of a generally U-shaped cross section, a tubular body is expanded to press the outer surface of the sealant by the molding surface of the main body. Therefore, the molding surface allows the outer surface of the sealant to be formed in conformity with the shape thereof. The projections/recesses of the jointed part are hence prevented from being transferred to the outer surface of the sealant. Since it is not necessitated to attach the decorative member such as the roof molding or the like, the number of parts and working steps to assemble, for instance, a roof panel is reduced.

According to the sealing method of the present invention using the molding tool for sealant, when the sealant with the molding tool is employed, the disposing process to bring the molding surface of the molding tool for sealant in touch with the outer surface of the sealant after the sealant is disposed at the jointed part becomes omissible, and at the same time, the outer surface of the sealant can be molded after the sealant seals the jointed part.

What is claimed is:

1. A tool for molding an exposed surface of a resin sealant material deposited within a generally U-shaped groove formed by two overlapping pieces, said tool comprising an elongated member shaped and dimensioned to fit within the groove and contact, so as to mold, the entire exposed surface of the sealant material at one time, and further comprising a magnetic material exhibiting a magnetic force sufficient for pressing said elongated member into contact with the surface of the sealant.

2. A tool according to claim 1 further comprising a pressing member for pressing said elongated member into contact with the surface of the sealant.

3. A tool according to claim 1 wherein said elongated member comprises a magnetic material exhibiting a magnetic force sufficient for pressing said elongated member into contact with the surface of the sealant.

4. A tool according to claim 2 wherein said pressing member comprises a magnetic material that exhibits uninduced magnetism for pressing said elongated member into contact with the surface of the sealant.

5. A tool according to claim 2 wherein said elongated member and said pressing member each comprise a magnetic material, at least together said elongated member and pressing member exhibit a magnetic force for pressing said elongated member into contact with the surface of the sealant.

6. A tool according to claim 2 wherein said pressing member is integral with said elongated member.

7. A tool according to claim 1 wherein said elongated member comprises side edges, each of the side edges includes a projecting part adapted to engage an opposite side wall of the groove to refrain the sealant from leaking out of the groove in a direction opposite to the direction said elongated member is pressed into contact with the surface of the sealant.

8. An intermediate assembly comprising:
 a generally U-shaped groove having opposite side walls and a bottom formed by a joint of overlapping pieces;
 a sealant material deposited within said groove so as to cover and, when cured, seal said joint; and
 a tool in contact with and thereby molding an outer surface of said sealant material, said tool comprising:
  an elongated member shaped and dimensioned to fit within said groove and contact said sealant material so as to mold said outer surface, and further comprising a magnetic material exhibiting a magnetic force sufficient for pressing said elongated member into contact with the outer surface of the sealant material.

9. An intermediate assembly according to claim 8, wherein said tool comprises a pressing member for pressing said elongated member into contact with the outer surface of said sealant material.

10. An intermediate assembly according to claim 9, wherein said pressing member comprises a magnetic material that exhibits uninduced magnetism to press said elongated member into contact with the exposed surface of said sealant material.

11. An intermediate assembly according to claim 8, wherein said elongated member comprises a magnetic material that keeps said tool in contact with the exposed surface of said sealant material.

12. An intermediate assembly according to claim 8, wherein said elongated member comprises a molding surface and opposite side edges, said side edges defining the peripheral sides of said tool, said elongated member being shaped and dimensioned so that said side edges fit within said groove and so that said molding surface contacts and molds the outer surface of said sealant material so as to cover the joint with said sealant material.

13. An intermediate assembly according to claim 8, wherein said elongated member comprises tapered side edges adapted to engage said groove so as to refrain said sealant from leaking along the side walls of said groove in a direction opposite to the direction said elongated member is pressed into contact with the exposed surface of said sealant material.

14. An intermediate assembly according to claim 8, wherein the overlapping pieces of said joint form part of a vehicle body.

15. A tool for molding an outer surface of a resin sealant material deposited within a generally U-shaped groove on a vehicle body, the groove having opposite side walls and a bottom formed by a joint of overlapping pieces, said tool comprising:

an elongated member with a molding surface and opposite side edges, said opposite side edges define the peripheral sides of said tool, and said elongated member being shaped and dimensioned so that said side edges fit within the generally U-shaped groove and so that said molding surface contacts and molds the outer surface of the sealant,
 wherein said tool can be pressed against the outer surface of the resin sealant material so as to cover the joint with the resin sealant material, and said tool further comprises a magnetic material that exhibits a magnetic force sufficient for pressing said elongated member into contact with the outer surface of the sealant.

16. A tool according to claim 15, wherein said opposite side edges are tapered side edges adapted to engage the groove to refrain the sealant from leaking along the side walls of the groove in a direction opposite to the direction said elongated member is pressed into contact with the surface of the sealant.

17. A tool according to claim 15, further comprising a magnetic material that exhibits uninduced magnetism causing said elongated member to press into contact with the exposed surface of the resin sealant material.

18. A tool for molding an exposed surface of a resin sealant material deposited within a generally U-shaped groove formed by two overlapping pieces,
 said tool comprising an elongated member shaped and dimensioned to fit within the groove and contact, so as to mold, the entire exposed surface of the sealant material at one time, and further comprising a pressing member for pressing said elongated member into contact with the surface of the sealant, said pressing member inflating under the action of gas or liquid.

19. A tool for molding an exposed surface of a resin sealant material deposited within a generally U-shaped groove formed by two overlapping pieces,
 said tool comprising an elongated member shaped and dimensioned to fit within the groove and contact, so as to mold, the entire exposed surface of the sealant material at one time, said elongated member comprising tapered side edges, with each of the side edges including a projecting part adapted to engage the groove to refrain the sealant from leaking out of the groove in a direction opposite to the direction said elongated member is pressed into contact with the surface of the sealant.

20. An intermediate assembly comprising:
 a generally U-shaped groove having opposite side walls and a bottom formed by a joint of overlapping pieces;
 a sealant material deposited within said groove so as to cover and, when cured, seal said joint; and
 a tool in contact with and thereby molding an outer surface of said sealant material, said tool comprising:
  an elongated member shaped and dimensioned to fit within said groove and contact said sealant material so as to mold said outer surface, and a pressing member, for pressing said elongated member into contact with the outer surface of said sealant material, said pressing member inflates under the action of gas or liquid to press said elongated member into contact with the outer surface of said sealant material.

21. An intermediate assembly comprising:
 a generally U-shaped groove having opposite side walls and a bottom formed by a joint of overlapping pieces;
 a sealant material deposited within said groove so as to cover and, when cured, seal said joint; and a tool in contact with and thereby molding an outer surface of said sealant material, said tool comprising:

an elongated member shaped and dimensioned to fit within said groove and contact said sealant material so as to mold said outer surface, said elongated member having opposite side edges that are tapered and adapted to engage said groove to refrain said sealant from leaking along the side walls of said groove in a direction opposite to the direction said elongated member is pressed into contact with the outer surface of said sealant.

22. A tool for molding an outer surface of a resin sealant material deposited within a generally U-shaped groove on a vehicle body, the groove having opposite side walls and a bottom formed by a joint of overlapping pieces, said tool comprising:

an elongated member with a molding surface and opposite side edges, said opposite side edges define the peripheral sides of said tool, and said elongated member being shaped and dimensioned so that said side edges fit within the generally U-shaped groove and so that said molding surface contacts and molds the outer surface of the sealant, wherein said tool can be pressed against the outer surface of the resin sealant material so as to cover the joint with the resin sealant material, and said tool further comprises a pressing member that inflates under the action of gas or liquid to press said elongated member in contact with the surface of the resin sealant material.

* * * * *

UNITED STATES PATENT AND TRADEMARK OFFICE
CERTIFICATE OF CORRECTION

PATENT NO. : 6,056,526
DATED : May 2, 2000
INVENTOR(S) : Shinobu Sato

It is certified that error appears in the above-identified patent and that said Letters Patent is hereby corrected as shown below:

<u>Title page,</u>
Under "OTHER PUBLICATIONS", first entry, "Hachk's" should read -- Hackh's --.

Signed and Sealed this

Thirtieth Day of October, 2001

*Attest:*

*Attesting Officer*

NICHOLAS P. GODICI
*Acting Director of the United States Patent and Trademark Office*